United States Patent
Takayama et al.

(10) Patent No.: US 6,412,884 B1
(45) Date of Patent: Jul. 2, 2002

(54) SOLENOID-CONTROLLED VALVE (75) Inventors: Toshio Takayama; Masaru Sakuma; Kunihiro Matsunaga, all of Yamanashi-ken (JP)

(73) Assignee: Tokico Ltd., Kanagawa (JP)

( * ) Notice: Subject to any disclaimer, the term of this patent is extended or adjusted under 35 U.S.C. 154(b) by 0 days.

(21) Appl. No.: 09/404,816

(22) Filed: Sep. 24, 1999

(30) Foreign Application Priority Data

Sep. 30, 1998 (JP) ............................................ 10-277171
Jan. 29, 1999 (JP) ............................................ 11-021972

(51) Int. Cl.$^7$ ................................................. B60T 8/36
(52) U.S. Cl. .................................. 303/119.2; 137/596.1
(58) Field of Search ........................... 303/119.1, 119.2; 137/625.65, 596.1

(56) References Cited

U.S. PATENT DOCUMENTS

| | | | | |
|---|---|---|---|---|
| 3,921,666 A | * | 11/1975 | Leiber | 137/557 |
| 4,526,203 A | * | 7/1985 | Leiber | 137/627.5 |
| 5,609,400 A | * | 3/1997 | Hashida | 303/119.2 |
| 5,921,281 A | * | 7/1999 | Takayama et al. | 137/625.65 |
| 6,086,164 A | * | 7/2000 | Oehler et al. | 303/119.2 |
| 6,199,961 B1 | * | 3/2001 | Beck | 303/116.1 |
| 6,206,038 B1 | * | 3/2001 | Klein et al. | 137/596.17 |

* cited by examiner

Primary Examiner—Paul N. Dickson
Assistant Examiner—Bradley King
(74) Attorney, Agent, or Firm—Wenderoth, Lind & Ponack, L.L.P.

(57) ABSTRACT

A solenoid-controlled valve has first and second valve bodies axially movably provided in a bore of a cylinder. A first spring is interposed between an end of th valve and the first valve body, a second spring is interposed between the two valve bodies, and an electromagnetic force generating device has a movable member which causes the two valve bodies to move in association with each other. Valve opening and closing modes of the two valve bodies are changed in a plurality of stages according to the displacement of the movable member. A restricting portion restricts relative displacement of the two valve. bodies away from each other so that the influence of the urging force of the second spring on the driving force of the electromagnetic force generating device becomes zero in the valve opening and closing mode in the final stage.

8 Claims, 8 Drawing Sheets

SOLENOID-CONTROLLED VALVE

BACKGROUND OF THE INVENTION

The present invention relates to a solenoid-controlled valve suitable for use in hydraulic controllers for brakes, for example, an anti-lock brake controller.

One example of conventional solenoid-controlled valves is disclosed in Japanese Patent Application Unexamined Publication (KOKAI) No. 7-144629 (1995). U.S. Pat. Nos. 5,577,815 and 5,609,400 correspond to this Japanese literature. The solenoid-controlled valve has a housing, both ends of which are closed. The housing has a first port and a second port which are provided in a side wall thereof in series from one end toward the other end. A third port is provided at the other end of the housing. A first valve body slides in the housing in a longitudinal direction to bring the first and second ports into and out of communication with each other. A second valve body is placed in the housing so as to be movable in the longitudinal direction to bring the second and third ports into and out of communication with each other. A first spring (first urging member) is interposed between the one end of the housing and the first valve body to urge the first valve body in a valve opening direction. A second spring (second urging member) is interposed between the second valve body and a reduced-diameter portion formed in the housing between the first and second ports to urge the second valve body in a valve closing direction. An electromagnetic force generating device is provided at the one end of the housing. A movable member is engaged with the first and second valve bodies and moved in the housing in the longitudinal direction by an electromagnetic force from the electromagnetic force generating device against urging forces of the first and second springs to cause the first and second valve bodies to move to valve opening or closing positions. The solenoid-controlled valve operates as follows:

1̂ When there is no electromagnetic force from the electromagnetic force generating device, the first valve body is placed in the valve opening position by the urging force of the first spring, and the second valve body is placed in the valve closing position by the urging force of the second spring.

2̂ When the electromagnetic force of the electromagnetic force generating device is set to a first predetermined value, the movable member causes the first valve body to move to the valve closing position against the urging force of the first spring, and the second valve body is placed in the valve closing position by the urging force of the second spring.

3̂ When the electromagnetic force of the electromagnetic force generating device is set to a second predetermined value larger than the first predetermined value, the movable member causes the first valve body to move to the valve closing position against the urging force of the first spring and also causes the second valve body to move to the valve opening position against the urging force of the second spring.

Incidentally, to move the first valve body to the valve closing position in the above-described prior art, it is necessary to generate an electromagnetic force that is sufficiently large to move the first valve body against the urging force of the first spring. To move the second valve body to the valve opening position, it is necessary to generate an electromagnetic force that is large enough to move the second valve body against the urging forces of the first and second springs. Accordingly, the prior art needs to prepare a coil enduring a large electric current or a coil with a large number of turns, resulting in an increase in size of the apparatus. This may make it difficult to ensure a space for installation and also cause an increase in the battery capacity.

With a view to facilitating understanding of the present invention, the known solenoid-controlled valve disclosed in the above-mentioned Japanese Patent Application Unexamined Publication (KOKAI) No. 7-144629 (1995) will be described below with reference to FIGS. 8 and 9 (first prior art) and FIGS. 10 and 11 (second prior art).

Figure 8:
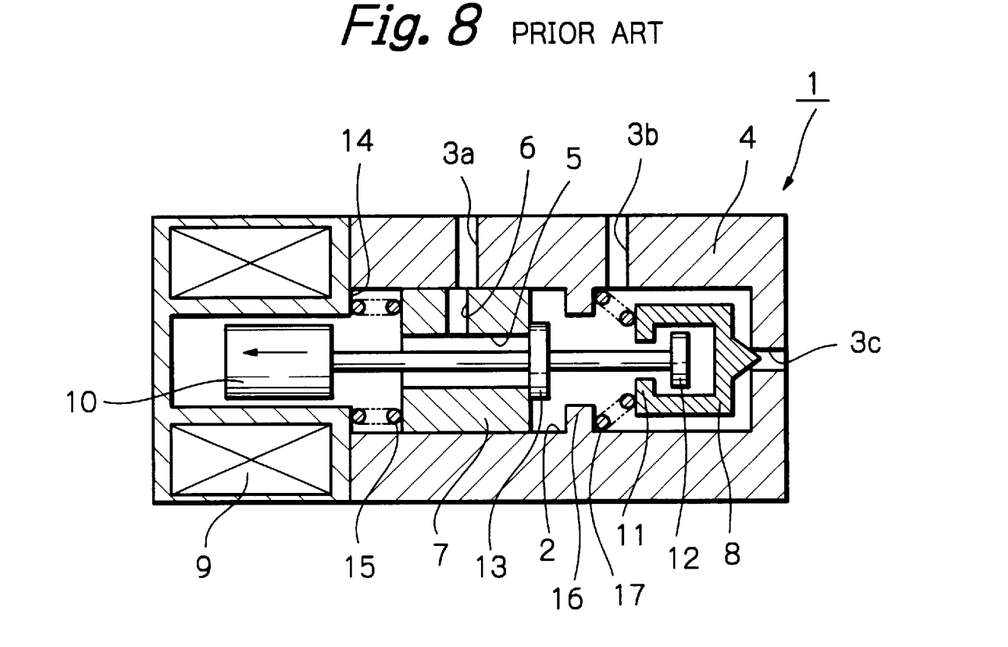
FIG. 8 is a sectional view showing one example of known solenoid-controlled valves.

As shown in FIG. 8, a solenoid-controlled valve 1 according to the first prior art has a cylinder 4 formed with three ports 3a, 3b and 3c communicating with a cylinder bore 2. Of the three ports 3a, 3b and 3c, two ports are formed in a side wall of the cylinder 4, and the other port is formed in a bottom (right-hand end as viewed in FIG. 8) of the cylinder 4. For the sake of convenience, the ports formed in the side wall of the cylinder 4 are referred to as "a-port 3a and b-port 3b", and the port formed in the bottom as "c-port 3c".

A spool 7 is provided in the cylinder bore 2 so as to be movable with respect to the a-port 3a. The spool 7 has an insertion bore 5 and a passage (spool passage) 6. The spool passage 6 communicates with the insertion bore 5 at one end thereof and opens on the side surface of the spool 7 at the other end thereof. In addition, a poppet valve 8 with an approximately C-shaped sectional configuration is provided in the cylinder bore 2 so as to be movable with respect to the c-port 3c.

A solenoid 9 is provided at one end of the cylinder 4. A shaft-shaped movable member 10 is provided in such a manner as to be inserted into the solenoid 9. The movable member 10 is driven by the solenoid 9.

The movable member 10 extends through the insertion bore 5 of the spool 7 to reach a hollow portion (no reference numeral) of the poppet valve 8. A projection (referred to as "first projection") 12 is formed at the distal end of the movable member 10. The first projection 12 is engageable with a wall portion 11 of an opening of the poppet valve 8. Another projection (referred to as "second projection") 13 is formed on an intermediate portion of the movable member 10. The second projection 13 is engageable with the spool 7.

A spring (first spring) 15 is interposed between the spool 7 and a step portion 14 formed at one end of the cylinder bore 2. The first spring 15 urges the spool 7 toward the other end of the cylinder bore 2. A spring (second spring) 17 is interposed between the poppet valve 8 and a spring retaining portion 16 projecting inward in the cylinder bore 2 between the a-port 3a and the b-port 3b. The second spring 17 presses the poppet valve 8 against the c-port 3c.

When the solenoid-controlled valve 1 is not energized, the a-port 3a and the passage 6 in the spool 7 are in communication with each other (i.e., the spool 7 is in a valve opening position), and the poppet valve 8 is in a position where it closes the c-port 3c.

The movable member 10 is displaced according to the value of electric current supplied to the solenoid 9. According to the amount of displacement (stroke) of the movable member 10, valve opening and closing modes of the spool 7 and the poppet valve 8 are changed over as shown in Table 1 below. FIG. 9 shows the relationship between the stroke and the spring force in the operation of the solenoid-controlled valve 1 according to the first prior art.

TABLE 1

| Current value | Non-energized | First reference range | Second reference range | Third reference range |
|---|---|---|---|---|
| Stroke | $S_0$ | $S_0$ to $S_1$ | $S_1$ to $S_2$ | $S_2$ to $S_3$ |
| Spool 7 | | Open | Closed | Closed |
| Poppet valve 8 | | Closed | Closed | Open |
| Valve opening & closing mode | | First mode | Second mode | Third mode (final stage) |

TABLE 2

| Current value | Non-energized | First reference range | Second reference range | Third reference range |
|---|---|---|---|---|
| Stroke | $S_0$ | $S_0$ to $S_1$ | $S_1$ to $S_2$ | $S_2$ to $S_3$ |
| Spool 7 | | Open | Closed | Closed |
| Poppet valve 8 | | Closed | Closed | Open |
| Valve opening & closing mode | | First mode | Second mode | Third mode (final stage) |

Figure 9:
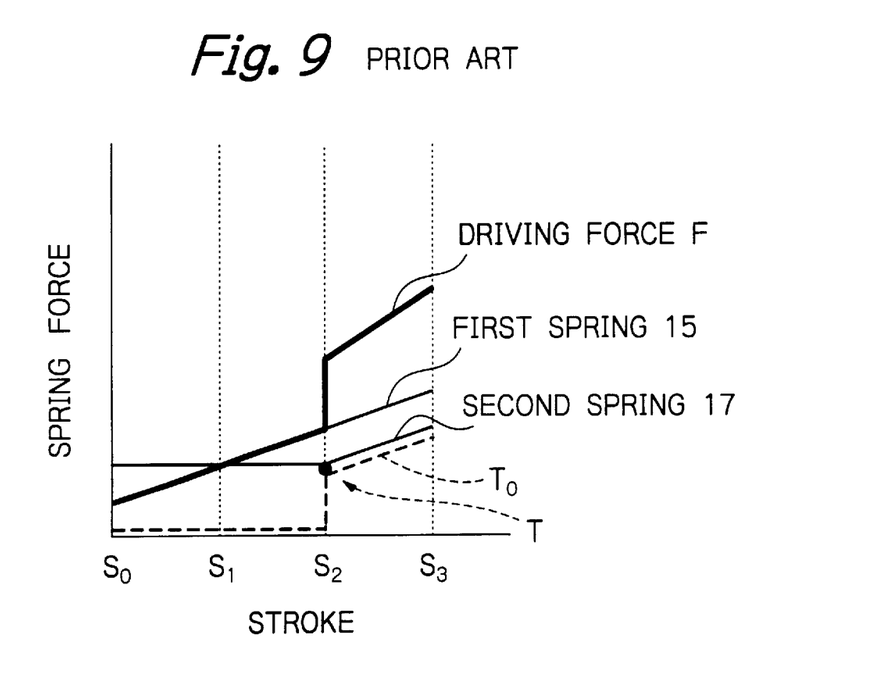
FIG. 9 is a diagram showing stroke-spring force characteristics of the solenoid-controlled valve in FIG. 8.

In FIG. 9 and Table 1: stroke $S_0$ shows an initial position; $S_1$ shows a position where the a-port 3a is closed; $S_2$ shows a position where the first projection 12 is engaged with the poppet valve 8; and shows a predetermined stroke position exceeding $S_2$. The current value increases as the reference range shifts from the first to the second and further to the third.

As shown in FIG. 9, in the stroke range of $S_0$ to $S_2$, the first spring 15 increases in spring force as the stroke becomes longer, whereas the second spring 17 exhibits a constant spring force independently of the displacement of the movable member 10 (solenoid 9). In the stroke range of $S_2$ to $S_3$, both the first and second springs 15 and 17 increase in spring force as the stroke becomes longer. Accordingly, the driving force F to be generated by the solenoid 9 against the first and second springs 15 and 17 increases sharply (this force will hereinafter be referred to as "driving force").

The spring force of the second spring 17 acting against the driving force of the solenoid 9 (hereinafter referred to as "anti-solenoid spring force" for the sake of convenience) in the stroke range $S_0$ to $S_3$ is as shown by reference symbol T. The anti-solenoid spring force $T_0$ in the stroke range of $S_2$ to $S_3$ (hereinafter referred to as "final stage spring force"), which corresponds to the final stage in the stroke range $S_0$ to $S_3$, increases as the magnitude of the spring force of the second spring 17 increases, that is, the stroke increases.

Figure 10:
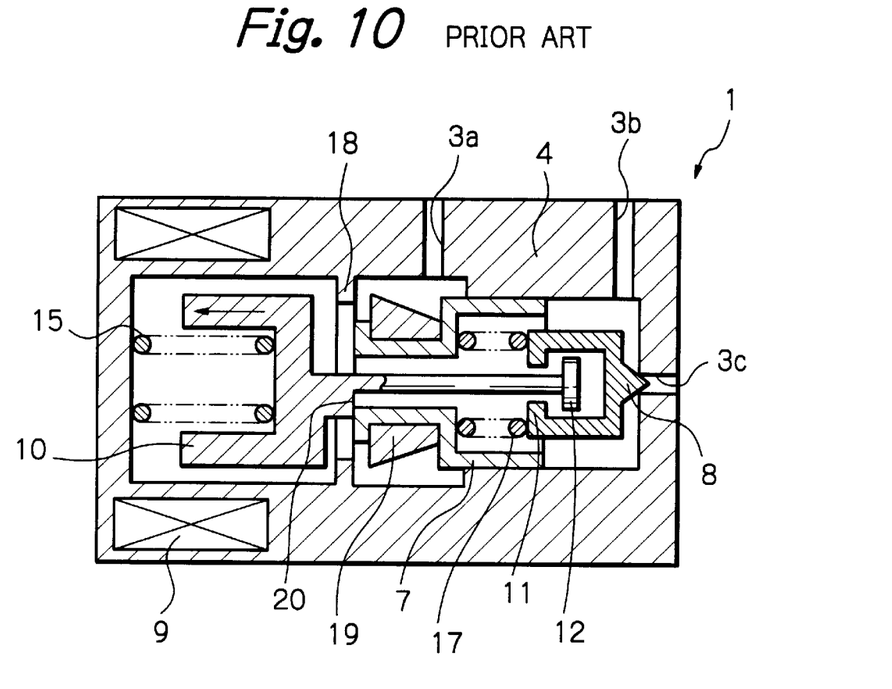
FIG. 10 is a sectional view showing another example of known solenoid-controlled valves.

As shown in FIG. 10, the solenoid-controlled valve 1 according to the second prior art has a valve seat (cylinder-side valve seat) 18 for the spool 7. The cylinder-side valve seat 18 projects in the cylinder bore 2 between the a-port 3a and one end of the cylinder bore 2. The first spring 15 is interposed between the movable member 10 and one end (left-hand end as viewed in FIG. 10) of the cylinder 4 to urge the movable member 10 rightward in FIG. 10. The second spring 17 is interposed between the spool 7 and the poppet valve 8 to urge them away from each other.

When the solenoid-controlled valve 1 is not energized, the valve body 19 of the spool 7 is separate from the cylinder-side valve seat 18, and thus the spool 7 is in a valve opening position. In addition, the poppet valve 8 is pressed to close the c-port 3c by the spring force of the second spring 17 and thus placed in a valve closing position. The spool 7 is engaged with a step portion 20 of the movable member 10. Thus, the spool 7 is restrained from moving leftward in FIG. 10.

The movable member 10 is displaced according to the value of electric current supplied to the solenoid 9. According to the amount of displacement (stroke) of the movable member 10, valve opening and closing modes of the spool 7 and the poppet valve 8 are changed over as shown in Table 2 below. FIG. 11 shows the relationship between the stroke and the spring force in the operation of the solenoid-controlled valve 1 according to the second prior art.

Figure 11:
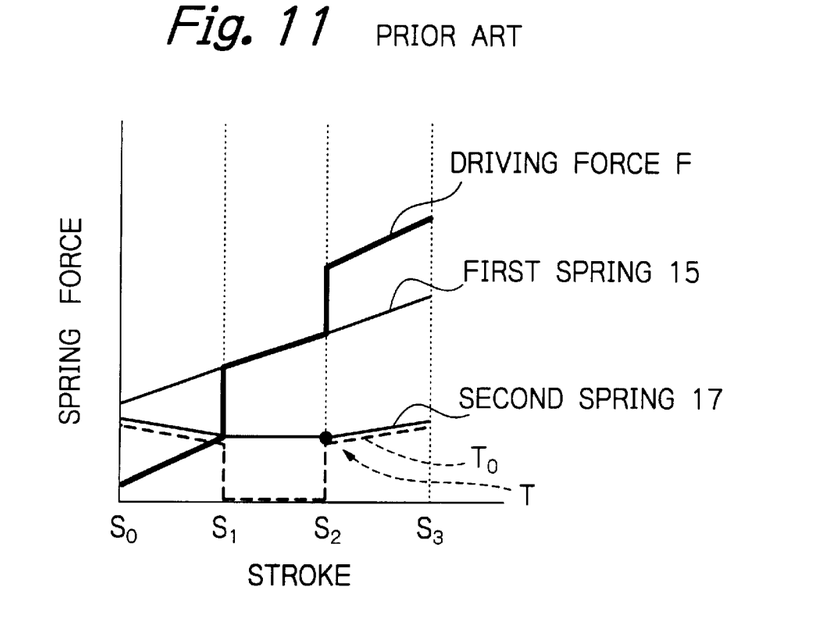
FIG. 11 is a diagram showing stroke-spring force characteristics of the solenoid-controlled valve in FIG. 10.

In FIG. 11 and Table 2: stroke $S_0$ shows an initial position; $S_1$ shows a position where the valve body 19 of the spool 7 rests on the cylinder-side valve seat 18; $S_2$ shows a position where the first projection 12 is engaged with the poppet valve 8; and shows a predetermined stroke position exceeding $S_2$.

As shown in FIG. 11, in the stroke range of $S_0$ to $S_1$, the first spring 15 increases in spring force as the stroke becomes longer, whereas the second spring 17 expands and thus decreases in spring force as the spool 7 moves leftward in association with the leftward movement of the movable member 10. Accordingly, the driving force F to be generated by the solenoid 9 is expressed by the expression: (spring force of first spring 15)—(spring force of second spring 17).

In the stroke range of $S_1$ to $S_2$, the first spring 15 increases in spring force as the stroke becomes longer, whereas the second spring 17 keeps a predetermined length (i.e., the spring force is constant) because the valve body 19 of the spool 7 rests on the cylinder-side valve seat 18. Accordingly, the driving force F to be generated by the solenoid 9 becomes of magnitude equivalent to the spring force of the first spring 15.

In the stroke range of $S_2$ to $S_3$, the first spring 15 increases in spring force as the stroke becomes longer, and the second spring 17 also increases in spring force because it is pushed by the poppet valve 8. As the result of the increase in spring force of the second spring 17, the driving force F to be generated by the solenoid 9 further increases in comparison to that required in the stroke range of $S_1$ to $S_2$.

In this case, the anti-solenoid spring force T and the final stage spring force $T_0$ of the second spring are as shown by the dashed lines in FIG. 11.

Incidentally, the above-described first prior art suffers from some problems. As shown in FIG. 9, in the stroke range of $S_2$ to $S_3$, both the first and second springs 15 and 17 increase in spring force as the stroke becomes longer (in other words, the final stage spring force $T_0$ assumes a large value). Consequently, the driving force F to be generated by the solenoid 9 becomes extremely large. Therefore, it is necessary to supply a large electric current to the solenoid 9 or to prepare a solenoid 9 with a large number of turns. This causes the apparatus to increase in size and hence makes it difficult to ensure a space for installation. Moreover, the battery capacity may need to be increased. The second prior art also involves problems similar to those of the first prior art. That is, in the stroke range of $S_2$ to $S_3$, the spring force increases (i.e., the final stage spring force $T_0$ assumes a large value) as the stroke becomes longer. Consequently, the driving force F to be generated by the solenoid 9 becomes extremely large. This gives rise to problems as stated above.

SUMMARY OF THE INVENTION

In view of the above-described circumstances, an object of the present invention is to provide a compact solenoid-controlled valve requiring a reduced electric current.

The present invention is applied to a solenoid-controlled valve having first and second valve bodies axially movably provided in a bore of a cylinder, a first spring interposed between the cylinder and the first valve body, a second spring interposed between the first and second valve bodies, and an electromagnetic force generating device having a movable member causing the first and second valve bodies to move in association with each other. Valve opening and closing modes of the first and second valve bodies are changed over in a plurality of stages according to the displacement of the movable member.

According to the present invention, the solenoid-controlled valve is provided with a restricting portion for restricting relative displacement of the first and second valve bodies when they are moved away from each other. Therefore, the urging force of the second spring acting against the driving force of the electromagnetic force generating device becomes zero in a valve opening and closing mode in the final stage of the valve opening and closing modes, which modes are changed over in a plurality of stages.

In the present invention, the electromagnetic force generating device may be provided to urge the first and second valve bodies by pushing. Alternatively, the electromagnetic force generating device may be provided to urge the first and second valve bodies by pulling.

DETAILED DESCRIPTION OF THE INVENTION

A solenoid-controlled valve 1 according to a first embodiment of the present invention will be described below with reference to FIGS. 1 to 6. The solenoid-controlled valve 1 (three position solenoid-controlled valve) is provided in a hydraulic controller (not shown) for a brake, for example, an anti-lock brake controller. The solenoid-controlled valve 1 is unitized so as to be inserted into a predetermined portion of a manifold formed with a fluid passage in the same way as in the case of a plug or the like.

Figure 1:
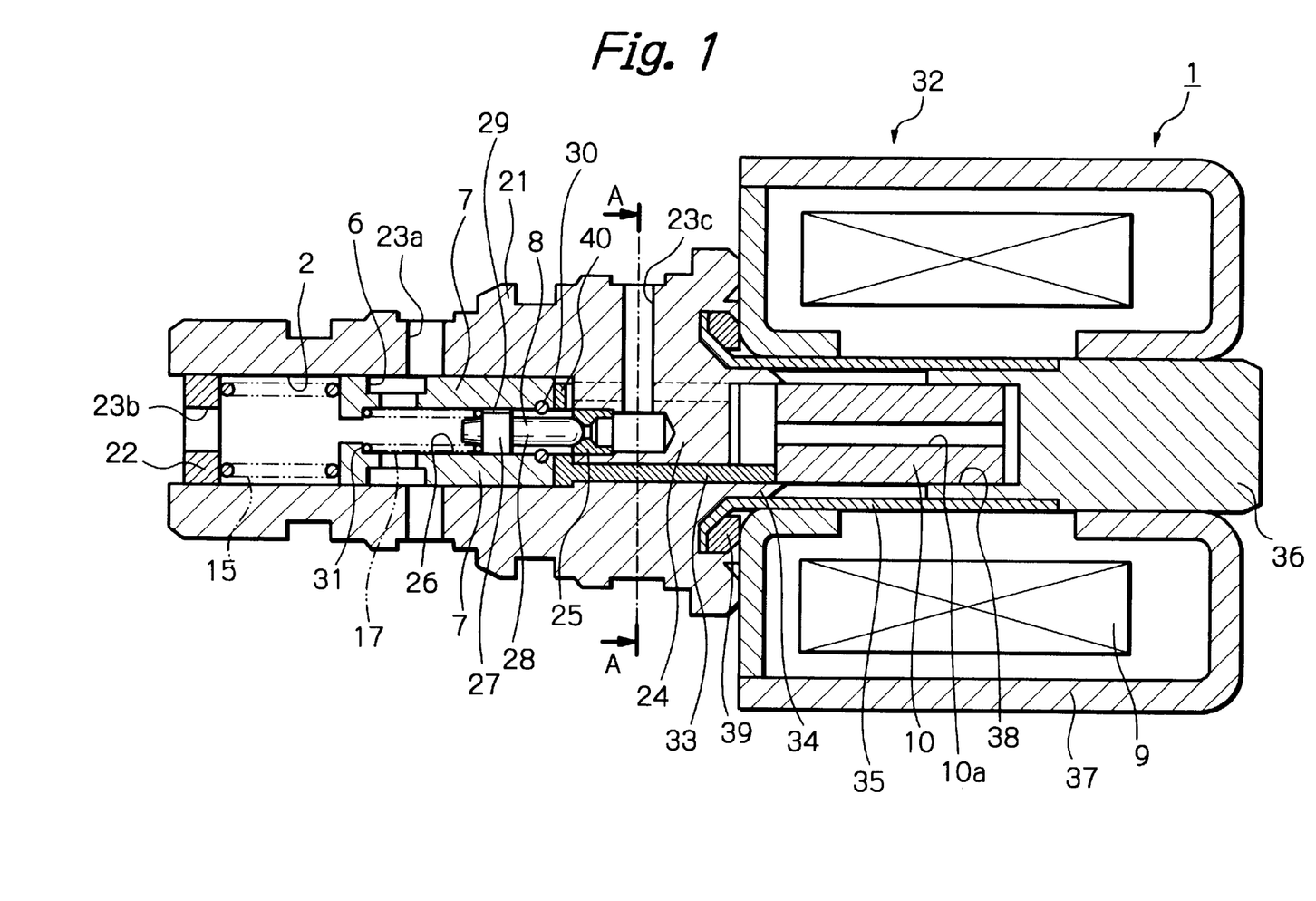
FIG. 1 is a sectional view showing a solenoid-controlled valve according to a first embodiment of the present invention.
Figure 2:
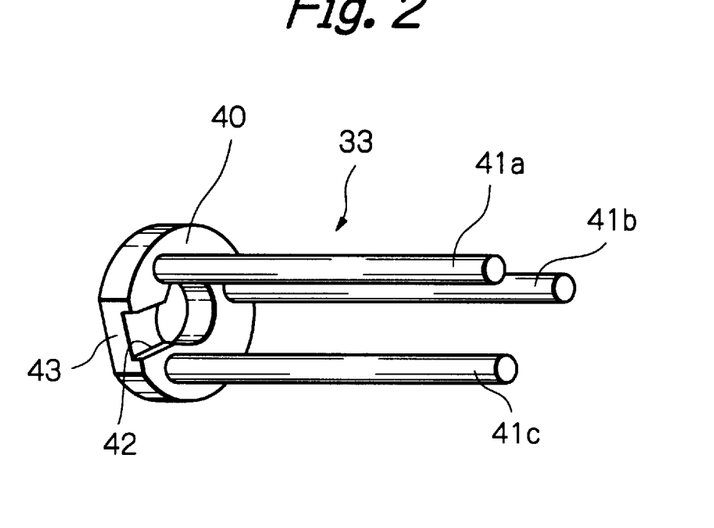
FIG. 2 is a perspective view showing an intermediate member in FIG. 1.
Figure 3:
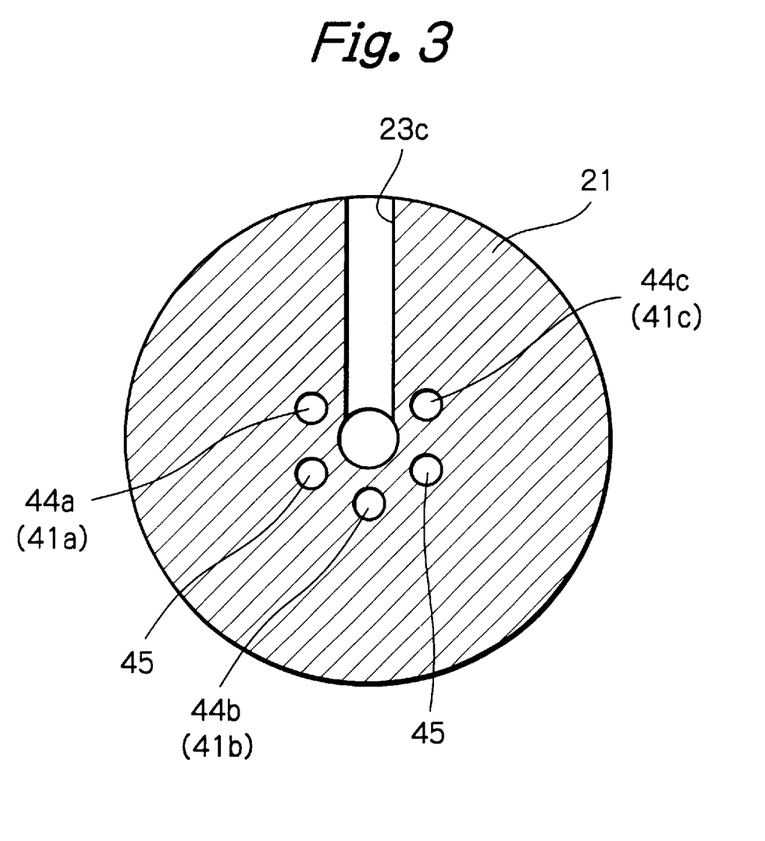
FIG. 3 is a sectional view taken along the line A—A in FIG. 1.

Referring to FIGS. 1 to 3, the solenoid-controlled valve 1 has a cylinder body 21 having a first end and a second end, one end (for example, the first end in FIG. 1) of which is closed. The cylinder body 21 also has a cylinder bore 2. A cylindrical spool 7 (first valve body) is axially movably provided in the cylinder bore 2. A poppet valve 8 (second valve body) is axially movably provided in an internal space (described later) formed in the spool 7. A cover 22 is fitted into an opening portion of the cylinder bore 2.

The cylinder body 21 is formed with two ports 23a and 23c that open on the side surface of the cylinder body 21 and communicate with the cylinder bore 2. The cover 22 is formed with one port 23b that communicates with the cylinder bore 2. Of the two ports 23a and 23c formed in the side wall of the cylinder body 21, the port 23a opens into the cylinder bore 2 at an approximately central portion in the axial direction of the cylinder bore 2, and the other port 23c opens to the cylinder bore 2 through a valve seat 25 that is provided to face in the axial direction in a bottom portion 24 (at the first end) of the cylinder body 21. For the sake of convenience, the former of the two ports formed in the side wall of the cylinder body 21 (i.e., the port that opens into the cylinder bore 2 at an approximately central portion in the axial direction of the cylinder bore 2) will hereinafter be referred to as "first port 23a", and the port formed in the cover 22 as "second port 23b", and further the port that opens to the cylinder bore 2 through the valve seat 25 as "third port 23c".

In this embodiment, the solenoid-controlled valve 1 is adapted for use in an anti-lock brake controller. The first port 23a is connected with a master cylinder (not shown). The second port 23b is connected with a wheel cylinder (not shown). The third port 23c is connected with a low-pressure chamber (not shown). Thus, the solenoid-controlled valve 1 performs the functions of intensifying, reducing and holding hydraulic pressure.

Figure 4:
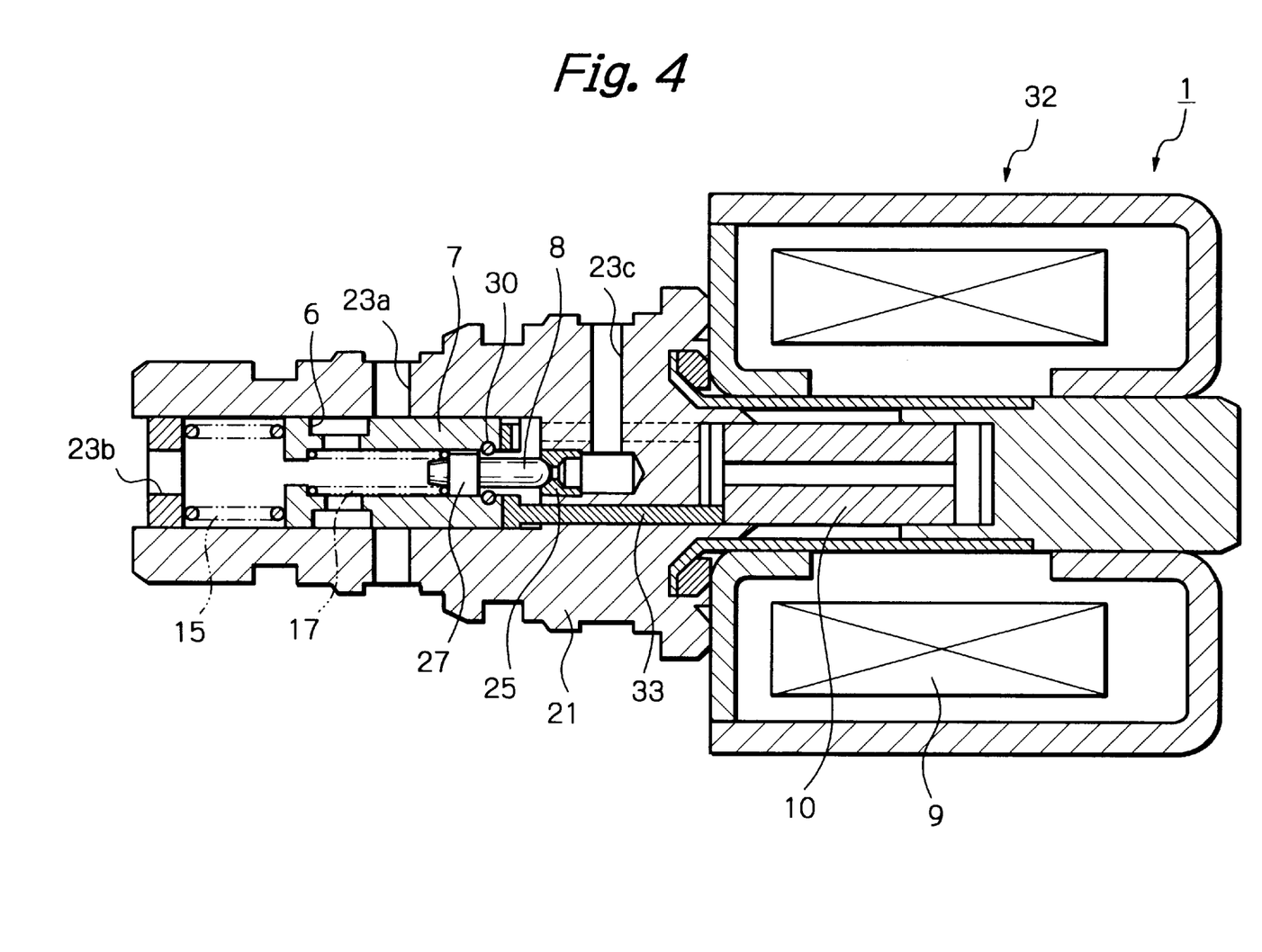
FIG. 4 is a sectional view showing the way in which a spool and a poppet valve are moved to valve opening or closing positions when an electric current is supplied to a solenoid in the solenoid-controlled valve shown in FIG. 1.

The spool 7 is formed with a spool passage 6 that opens on a side surface thereof. The spool passage 6 communicates with an internal space (hereinafter referred to as "spool bore") 26 axially extending through the spool 7. In the initial state (FIG. 1), the spool passage 6 faces the first port 23a. Thus, the first port 23a and the second port 23b communicate with each other through the spool passage 6, the spool bore 26 and the cylinder bore 2 (i.e., the spool 7 is in a valve opening position). When the spool 7 moves to a position where the spool passage 6 separates from the first port 23a as shown in FIG. 4 or FIG. 5, the communication between the first port 23a and second port 23b is cut off (i.e., the spool 7 is placed in a valve closing position).

The poppet valve 8 consists essentially of a large-diameter portion 27 having a diameter approximately equal to the diameter of the spool bore 26 and a valve body (poppet valve body) 28 extending from the large-diameter portion 27 toward the bottom portion 24 of the cylinder body 21. The large-diameter portion 27 is formed with a passage (poppet passage) 29 opening on both ends (left- and right-hand ends as viewed in FIG. 1) of the large-diameter portion 27. In the initial state (FIG. 1), the poppet valve body 28 is pressed against the valve seat 25 of the third port 23c, and thus the third port 23c is closed (i.e., the poppet valve 8 is in a valve closing position). As will be stated later, when the poppet valve 8 moves leftward as a movable member 10 is displaced, as shown for example in FIG. 5, the poppet valve body 28 separates from the opening portion of the third port 23c, that is, the valve seat 25 (i.e., the poppet valve 8 is placed in a valve opening position).

Figure 5:
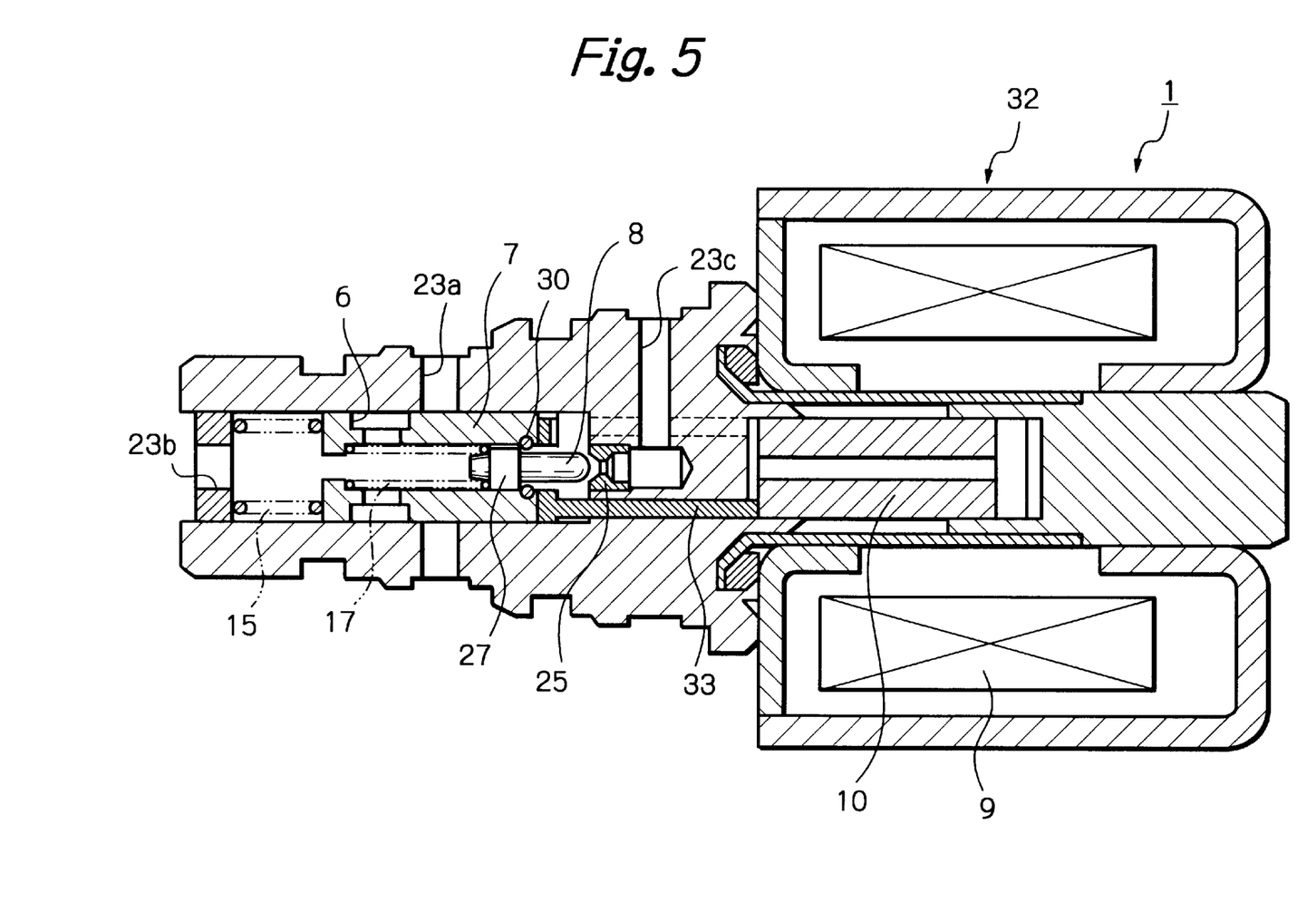
FIG. 5 is a sectional view showing the way in which the spool and the poppet valve are moved to valve opening or closing positions when the value of the supplied electric current is made larger than in the case of FIG. 4.

When the poppet valve 8 moves rightward in FIG. 1 by a predetermined amount relative to the spool 7, as shown in FIG. 5, the large-diameter portion (restricting portion) 27 abuts on a stopper (restricting portion) 30 mounted on the other end (right-hand end in FIG. 1) of the spool bore 26. Thus, further rightward movement of the poppet valve 8 is stopped.

Between the spool 7 and the cover 22, a first spring 15 is interposed to urge the spool 7 toward the bottom portion 24 of the cylinder body 21. A second spring 17 is interposed between the large-diameter portion 27 of the poppet valve 8 and a step portion 31 formed at one end (left-hand end in FIG. 1) of the spool bore 26 to urge the spool 7 leftward as viewed in FIG. 1 and also urge the poppet valve 8 rightward.

A proportional solenoid mechanism 32 (electromagnetic force generating device) is provided on the bottom portion 24 of the cylinder body 21. The proportional solenoid mechanism 32 is provided with a movable member 10. Displacing the movable member 10 causes the spool 7 to move through an intermediate member 33 axially extending through the bottom portion 24 of the cylinder body 21 as far as the spool bore 26, thereby changing over valve opening and closing modes of the spool 7 and the poppet valve 8.

The proportional solenoid mechanism 32 has a sleeve 35 fitted at one end thereof to a cylindrical portion (cylindrical projecting portion) 34 projecting outward from the cylinder body 21. A fixed member 36 (core) is fitted to the other end of the sleeve 35. An annular yoke 37 is fitted on the sleeve 35 and the fixed member 36 so as to be retained by these members. A solenoid 9 is placed in the yoke 37 to generate an electromagnetic force whose magnitude is proportional to an electric current supplied thereto from a battery (not shown). A cylindrical movable member 10 is accommodated in a space defined by a bore (no reference numeral) of the cylindrical projecting portion 34 and a recess 38 formed in the fixed member 36. The movable member 10 is movable horizontally as viewed in FIG. 1. A metallic seal member 39 is fitted on the outer periphery at the proximal end of the sleeve 35 and caulked to a projecting portion (no reference numeral) of the cylinder body 21 to prevent a fluid from leaking out of the sleeve 35. The material of the seal member 39 is not necessarily limited to a metal but may be other material, for example, an elastic material.

As shown in FIG. 2, the intermediate member 33 has an approximately ring-shaped intermediate member body 40 having a size with which it is slidable in the cylinder bore 2. Three shaft portions (intermediate member shaft portions) 41a, 41b and 41c are stood upright on the intermediate member body 40. A radially extending recess 42 is formed in a surface of the intermediate member body 40 on which the intermediate member shaft portions 41a, 41b and 41c are provided. A portion of the outer periphery of the intermediate member body 40 that faces the recess 42 is formed into a flat surface 43 to enable the intermediate member 33 to be readily positioned so that the recess 42 is placed on the third port (23c) side and bores 45 (described later) face opposite to the recess 42.

The intermediate member 33 is positioned as follows. The intermediate member body 40 is accommodated in the cylinder bore 2 between the bottom portion 24 and the spool 7. As shown in FIG. 3, the intermediate member shaft portions 41a, 41b and 41c are inserted into three bores 44a, 44b and 44c, respectively, formed in the bottom portion 24 of the cylinder body 21. The distal ends of the intermediate member shaft portions 41a, 41b and 41c project into the cylindrical projecting portion 34 to abut on the movable member 10, and the intermediate member body 40 abuts on the spool 7.

The bottom portion 24 of the cylinder body 21 is formed with two bores 45 such that the bores 45 and the three bores 44a, 44b and 44c are alternately arranged approximately in the circumferential direction. Both sides of the movable member 10 communicate with the second port 23b through the two bores 45 and a bore 10a formed in the movable member 10 so that pressures on the two opposite sides of the movable member 10 are equal to each other irrespective of the opening and closing operation of the poppet valve 8 (i.e., no pressure difference is produced between the two opposite sides of the movable member 10).

When the solenoid-controlled valve 1 is in a non-energized state (FIG. 1), the spool 7 is pushed by the spring force of the first spring 15. In this state, the spool passage 6 faces the first port 23a, as stated above. Thus, the first port 23a (master cylinder) and the second port 23b (wheel cylinder) communicate with each other through the spool passage 6, the spool bore 26 and the cylinder bore 2 (i.e., the spool 7 is in the valve opening position). The poppet valve 8 is pressed against the valve seat 25 by the second spring 17. Accordingly, the first and second ports 23a and 23b are out of communication with the third port 23c (i.e., the poppet valve 8 is in the valve closing position). Because the magnitude of the spring force of the first spring 15 is greater than that of the second spring 17, the spool 7 is placed in abutting contact with the body 40 of the intermediate member 33 and thus integral with the movable member 10 through the intermediate member 33.

Figure 6:
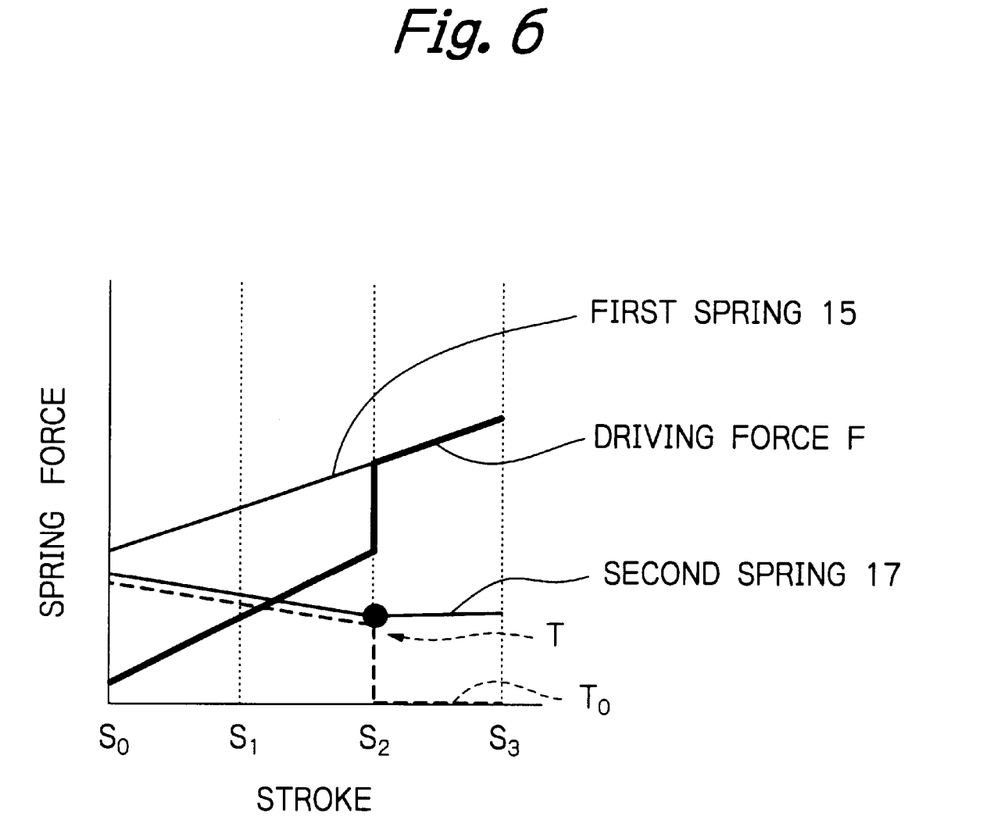
FIG. 6 is a diagram showing stroke-spring force characteristics of the solenoid-controlled valve in FIG. 1.

The movable member 10 is displaced according to the value of electric current supplied to the solenoid 9. According to the amount of displacement (stroke) of the movable member 10, valve opening and closing modes of the spool 7 and the poppet valve 8 are changed over as shown in Table 3 below. FIG. 6 shows the relationship between the stroke and the spring force in the operation of the solenoid-controlled valve 1 according to this embodiment.

TABLE 3

| Current value | Non-energized | First reference range | Second reference range | Third reference range |
| --- | --- | --- | --- | --- |
| Stroke | $S_0$ | $S_0$ to $S_1$ | $S_1$ to $S_2$ | $S_2$ to $S_3$ |
| Spool 7 | | Open | Closed | Closed |
| Poppet valve 8 | | Closed | Closed | Open |
| Valve opening & closing mode | | First mode | Second mode | Third mode (final stage) |

In FIG. 6 and Table 3: stroke $S_0$ shows an initial position; $S_1$ shows a position where the first port 23a is closed (FIG. 4); $S_2$ shows a position where the large-diameter portion 27 of the poppet valve 8 engages the stopper 30; and shows a predetermined stroke position exceeding $S_2$.

As shown in FIG. 6, in the stroke range of $S_0$ to $S_2$, the first spring 15 increases in spring force as the stroke becomes longer, whereas the second spring 17 expands as the spool 7 moves leftward in association with the leftward movement of the movable member 10 through the intermediate member 33 and thus decreases in spring force as the stroke becomes longer. Accordingly, the driving force F to be generated by the solenoid 9 is expressed by: (spring force of first spring 15)-(spring force of second spring 17).

In the stroke range of $S_2$ to $S_3$, the first spring 15 increases in spring force as the stroke becomes longer, whereas the second spring 17 is maintained at a predetermined length (i.e., the spring force is kept constant) because the large-diameter portion 27 of the poppet valve 8 is in engagement with the stopper 30 (i.e., the final stage spring force $T_0$ is zero, and the spool 7 and the poppet valve 8 are in the state of being integrally formed by a rigid body). Accordingly, the driving force F has a magnitude. corresponding to only the spring force of the first spring 15.

In the above-described solenoid-controlled valve 1, the movable member 10 moves leftward in FIG. 1 in response to the supply of electric current to the solenoid 9. This causes the spool 7 to be pushed through the intermediate member 33. Consequently, in the stroke range of $S_0$ to $S_2$, the spool 7 and the poppet valve 8 assume valve opening and closing modes (first and second modes) as shown in Table 3. In the stroke range of $S_0$ to $S_2$, the driving force F increases as the stroke becomes longer. In the stroke range of $S_2$ to $S_3$, as stated above, the second spring 17 is maintained at a predetermined length (i.e., the spring force is kept constant) because the large-diameter portion 27 of the poppet valve 8 is in engagement with the stopper 30 (i.e., the final stage spring force $T_0$ is zero, and the spool 7 and the poppet valve 8 are in the state of being integrally formed by a rigid body). Accordingly, the magnitude of the driving force F corresponds to only the spring force of the first spring 15. Therefore, it becomes unnecessary to supply a large electric current to the solenoid 9 or to prepare a solenoid 9 with a large number of turns, which has been necessary in the above-described prior art, and the size of the apparatus can be reduced correspondingly.

During the first mode in the stroke range of $S_0$ to $S_1$, the spool 7 is in the valve opening position, and the poppet valve 8 is in the valve closing position. Thus, the first port 23a (master cylinder) and the second port 23b (wheel cylinder) are in communication with each other, whereas the second port 23b (wheel cylinder) and the third port 23c (low-pressure chamber) are cut off from each other. Accordingly, the braking hydraulic pressure from the master cylinder is supplied to the wheel cylinder.

During the second mode in the stroke range of $S_1$ to $S_2$, the spool 7 is in the closing position, and the poppet valve 8 is also in the valve closing position. Thus, the second port 23b (wheel cylinder) is cut off from both the first port 23a (master cylinder) and the third port 23c (low-pressure chamber). Thus, the hydraulic pressure in the wheel cylinder is held (a hydraulic pressure holding mode is set).

During the third mode in the stroke range of $S_2$ to $S_3$, the spool 7 is in the valve closing position, and the poppet valve 8 is in the valve opening position. Thus, the second port 23b (wheel cylinder) is in communication with the third port 23c (low-pressure chamber). Accordingly, the pressure in the wheel cylinder is reduced (a pressure-reducing mode is set).

In this embodiment, the solenoid-controlled valve 1 is adapted for use in an anti-lock brake controller. The first port 23a is connected with a master cylinder (not shown). The second port 23b is connected with a wheel cylinder (not shown). The third port 23c is connected with a low-pressure chamber (not shown). Thus, the solenoid-controlled valve 1 performs the functions of intensifying, reducing and holding hydraulic pressure.

In the above-described embodiment, the electromagnetic force generating device is a proportional solenoid mechanism 32 by way of example. Accordingly, the magnitude of the generated electromagnetic force can be adjusted. Thus, it is possible to improve general versatility. It should be noted that the electromagnetic force generating device is not necessarily limited to the proportional solenoid mechanism 32 but may be another device, e.g., an ordinary electromagnet, which is capable of generating an electromagnetic force of the above-described magnitude.

It should be noted that the solenoid-controlled valve 1 may be arranged to function as an actuator for an automatic brake by connecting the first port 23a with a low-pressure chamber, the second port 23b with a wheel cylinder, and the third port 23c with a high-pressure source (in this case, the electromagnetic force generating device is desirably a proportional solenoid mechanism).

Although in the above-described embodiment the solenoid-controlled valve 1 uses a push type proportional solenoid mechanism 32, which pushes the spool 7, by way of example, it is also possible to use a pull type proportional solenoid mechanism 32, which pulls the spool 7, in place of the push type.

Figure 7:
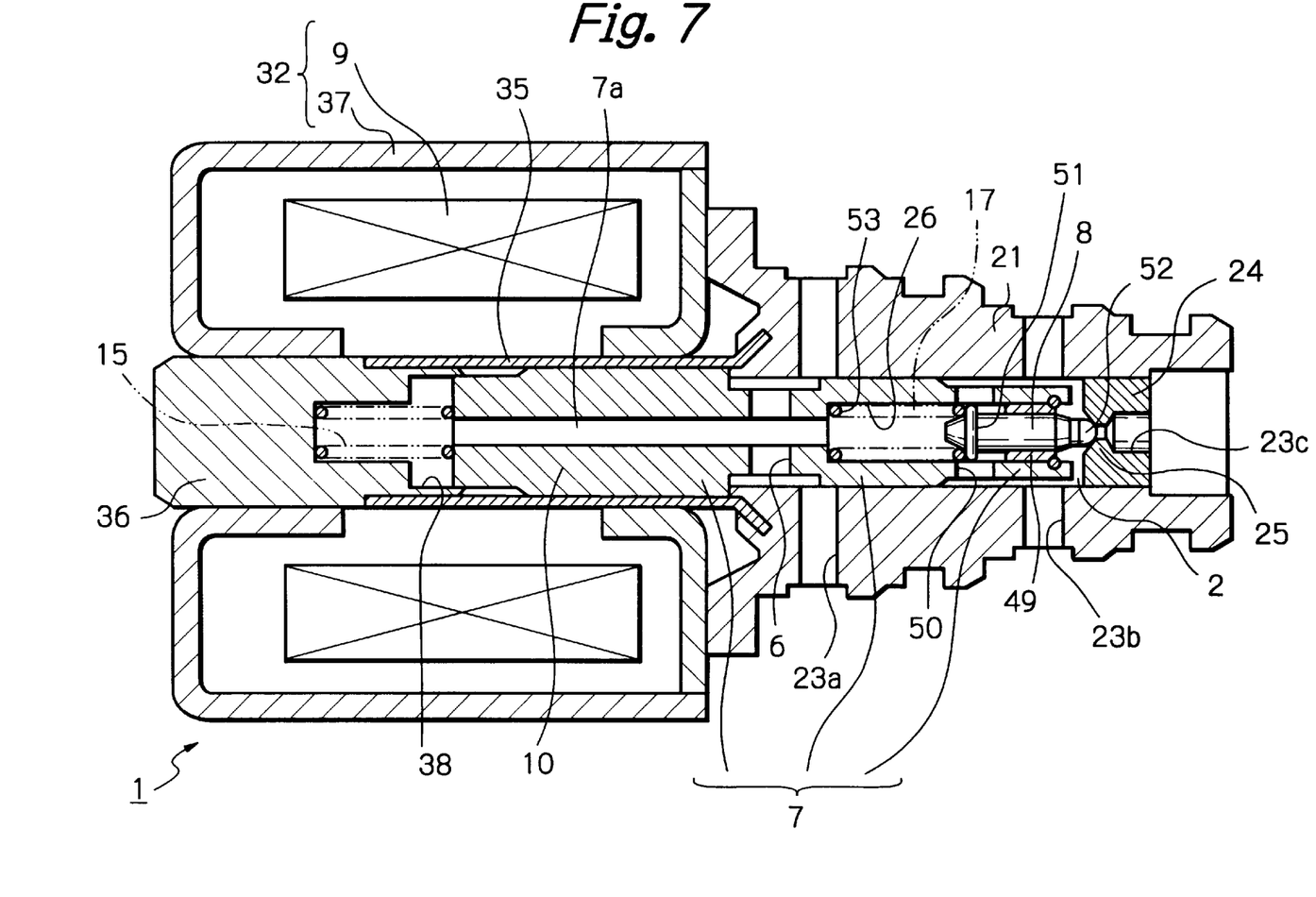
FIG. 7 is a sectional view showing a solenoid-controlled valve according to a second embodiment of the present invention.

FIG. 7 shows a solenoid-controlled valve 1 using a pull type proportional solenoid mechanism 32 (hereinafter referred to as "second embodiment").

Referring to FIG. 7, a first port 23a (master cylinder) and a second port 23b (wheel cylinder) are provided in a side wall of a cylinder body 21 in the order mentioned from the proximal (second) end side (left-hand side as viewed in FIG. 7) toward the distal (first) end side (right-hand side in FIG. 7). A third port 23c (constant-pressure chamber) is provided in the distal (first) end portion of the cylinder body 21.

A spool 7 is axially movably accommodated in a cylinder bore 2. The spool 7 has a spool passage 6 formed in a side wall thereof The spool passage 6 communicates with a spool bore 26 and opens on a side surface of the spool 7. One end portion (left end portion in FIG. 7) of the spool 7 functions as a movable member (this portion will hereinafter be referred to as "movable member portion 10"). The movable member may be formed as a separate member and connected to the spool 7. The other end portion (right end portion in FIG. 7) of the spool 7 is formed with a bore 50 communicating with the spool bore 26 and further provided with a wall member 49 (restricting portion).

A poppet valve 8 has a large-diameter portion (restricting portion) 51 with a larger diameter than the diameter of the wall member 49 and a valve shaft portion 52 extending from the large-diameter portion 51. The large-diameter portion 51 is accommodated in the spool bore 26, and the valve shaft portion 52 is inserted into the wall member 49. A first spring 15 is interposed between the movable member portion 10 and the wall portion of the cylinder body 21 to urge the spool 7 rightward as viewed in FIG. 7. A second spring 17 is interposed between the large-diameter portion 51 of the poppet valve 8 and a step portion 53 provided at an end of the spool bore 26 closer to the movable member portion 10 to urge the poppet valve 8 toward the third port 23c relative to the spool 7. In addition, a through-bore 7a is formed in the spool 7 to provide communication between the spool bore 26 and a space accommodating the movable member portion 10 at all times.

When the solenoid-controlled valve 1 is in a non-energized state (FIG. 7), the spool 7 is pushed by the spring force of the first spring 15. In this state, the spool passage 6 faces the first port 23a. Thus, the first port 23a (master cylinder) and the second port 23b (wheel cylinder) communicate with each other through the spool passage 6, the spool bore 26, the communicating bore 50 and the cylinder bore 2 (i.e., the spool 7 is in a valve opening position). The poppet valve 8 is pressed against the third port 23c (constant-pressure chamber) by the second spring 17. Accordingly, the first and second ports 23a and 23b are out of communication with the third port 23c (i.e., the poppet valve 8 is in the valve closing position).

The movable member portion 10 (spool 7) is displaced according to the value of electric current supplied to the solenoid 9. According to the amount of displacement (stroke) of the movable member portion 10, valve opening and closing modes of the spool 7 and the poppet valve 8 are changed over as shown in Table 4 below. The relationship between the stroke and the spring force in the operation of the solenoid-controlled valve 1 is the same as that shown in FIG. 6.

TABLE 4

| Current value | Non-energized | First reference range | Second reference range | Third reference range |
|---|---|---|---|---|
| Stroke | $S_0$ | $S_0$ to $S_1$ | $S_1$ to $S_2$ | $S_2$ to $S_3$ |
| Spool 7 | | Open | Closed | Closed |
| Poppet valve 8 | | Closed | Closed | Open |
| Valve opening & closing mode | | First mode | Second mode | Third mode (final stage) |

In FIG. 6 and Table 4: stroke $S_0$ shows an initial position; $S_1$ shows a position where the first port 23a is closed; $S_2$ shows a position where the end portion of the wall member 49 of the spool 7 engages the large-diameter portion 51 of the poppet valve 8; and shows a predetermined stroke position exceeding $S_2$.

The second embodiment provides advantageous effects as in the case of the first embodiment. As shown in FIG. 6, in the stroke range of $S_0$ to $S_2$, the first spring 15 increases in spring force as the stroke becomes longer, whereas the second spring 17 expands as the spool 7 moves leftward in association with the leftward movement of the movable member portion 10 and thus decreases in spring force as the stroke becomes longer. Accordingly, the driving force F to be generated by the solenoid 9 is expressed by: (spring force of first spring 15)–(spring force of second spring 17).

In the stroke range of $S_2$ to $S_3$, the first spring 15 increases in spring force as the stroke becomes longer, whereas the second spring 17 is maintained at a predetermined length (i.e., the spring force is kept constant) because the end portion of the wall member 49 of the spool 7 is in engagement with the large-diameter portion 51 of the poppet valve 8 (i.e., the final stage spring force $T_0$ is zero, and the spool 7 and the poppet valve 8 are in the state of being integrally formed by a rigid body). Accordingly, the driving force F has a magnitude corresponding to only the spring force of the first spring 15. Therefore, it becomes unnecessary to supply a large electric current to the solenoid 9 or to prepare a solenoid 9 with a large number of turns, which has been necessary in the above-described prior art, and the size of the apparatus can be reduced correspondingly.

According to the present invention, valve opening and closing modes of the first and second valve bodies are changed over in a plurality of stages according to the displacement of the movable member. The solenoid-controlled valve is provided with a restricting portion for restricting relative displacement of the first and second valve bodies when moved away from each other so that the urging force of the second spring acting against the driving force of the electromagnetic force generating device becomes zero in the valve opening and closing mode in the final stage. Thus, in the valve opening and closing mode in the final stage, the urging force of the second spring is maintained at a predetermined value. Therefore, the driving force of the electromagnetic force generating device that is required to overcome the urging forces of the first and second springs reduces correspondingly. Accordingly, it becomes unnecessary to supply a large electric current to the solenoid or to prepare a solenoid with a large number of turns, which has been necessary in the above-described prior art, and the size of the apparatus can be reduced correspondingly.

What is claimed is:

1. A solenoid-controlled valve comprising:
    a cylindrical housing having a first end and a second end, said housing having a first port and a second port which are provided at different distances from said first end in a longitudinal direction, said housing further having a third port provided at said first end;
    a first valve body slidable in said housing in said longitudinal direction to bring said first port and said second port into and out of communication with each other, said first valve body having a first restricting portion;
    a second valve body movable in said housing in said longitudinal direction to bring said second port and said third port into and out of communication with each other, said second valve body having a second restricting portion, said first restricting portion of said first valve body and said second restricting portion of said second valve body being operable to engage each other so as to restrict relative displacement of said first valve body and said second valve body when said first valve body and said second valve body move away from each other;
    a first spring for urging said first valve body in a valve opening direction;
    a second spring for urging said second valve body in a valve closing direction;
    an electromagnetic force generating device retained by said housing; and
    a movable member operatively interconnected to said first valve body and said second valve body, said movable member being movable in said housing in said longitudinal direction by an electromagnetic force of said electromagnetic force generating device against an urging force of said first spring to cause the first valve body and the second valve body to move to valve opening or closing positions;
    wherein said first valve body, said second valve body, said first spring, said second spring, said electromagnetic force generating device, and said movable member are arranged such that:
        when there is no electromagnetic force from said electromagnetic force generating device, said first valve body is placed in a valve opening position by the urging force of said first spring, and said second valve body is placed in a valve closing position by the urging force of said second spring;
        when the electromagnetic force of said electromagnetic force generating device is set to a first predetermined value, said movable member causes said first valve body to move to a valve closing position against a difference between the urging forces of said first spring and said second spring, and said second valve body is held in the valve closing position by the urging force of said second spring; and when the electromagnetic force of said electromagnetic force generating device is set to a second predetermined value larger than the first predetermined value, said movable member causes said first valve body to move to the valve closing position against the urging force of said first spring and also causes said second valve body to move to a valve opening position due to an engagement of said first restricting portion and said second restricting portion, whereby an influence of the urging force of said second spring on a driving force of said electromagnetic force generating device becomes zero.

2. A solenoid-controlled valve according to claim 1, wherein said movable member and said first valve body are integral with each other.

3. A solenoid-controlled valve according to claim 1, wherein said electromagnetic force generating device is a proportional solenoid mechanism which generates an electromagnetic force whose magnitude is proportional to an electric current supplied thereto.

4. A solenoid-controlled valve according to claim 1, wherein said first valve body is a spool which slides in a cylinder bore provided in said housing, said spool having a spool bore extending in an axial direction, and said second valve body is a poppet valve displaceably provided in said spool bore.

5. A solenoid-controlled valve according to claim 4, wherein said third port communicates with a valve seat opened and closed by an axial movement of said poppet valve, said second spring being accommodated in said spool bore, and said first spring and said second spring urge said spool and said poppet valve toward said valve seat, respectively.

6. A solenoid-controlled valve according to claim 2, wherein said electromagnetic force generating device is a proportional solenoid mechanism which generates an electromagnetic force whose magnitude is proportional to an electric current supplied thereto.

7. A solenoid-controlled valve comprising:

a cylindrical housing having a first end and a second end, said housing having a first port and a second port which are provided at different distances from said first end in a longitudinal direction, said housing further having a third port provided at said first end;

a first valve body slidable in said housing in said longitudinal direction to bring said first port and said second port into and out of communication with each;

a second valve body movable in said housing in said longitudinal direction to bring said second port and said third port into and out of communication with each other;

a first spring for urging said first valve body in a valve opening direction;

a second spring for urging said second valve body in a valve closing direction;

an electromagnetic force generating device retained by said housing; and a movable member operatively interconnected to said first valve body and said second valve body, said movable member and said first valve body being integral with each other, said movable member being movable in said housing in said longitudinal direction by an electromagnetic force of said electromagnetic force generating device against an urging force of said first spring to cause the first valve body and the second valve body to move to valve opening or closing positions;

wherein when there is no electromagnetic force from said electromagnetic force generating device, the first valve body is placed in a valve opening position by the urging force of the first spring, and the second valve body is placed in a valve closing position by the urging force of the second spring;

wherein when the electromagnetic force of said electromagnetic force generating device is set to a first predetermined value, said movable member causes the first valve body to move to a valve closing position against a difference between the urging forces of the first spring and second spring, and the second valve body is held in the valve closing position by the urging force of the second spring;

wherein when the electromagnetic force of said electromagnetic force generating device is set to, a second predetermined value larger than the first predetermined value, said movable member causes the first valve body to move to the valve closing position against the urging force of the first spring and also causes the second valve body to move to a valve opening position.

8. A solenoid-controlled valve according to claim 7, wherein said electromagnetic force generating device is a proportional solenoid mechanism which generates an electromagnetic force whose magnitude is proportional to an electric current supplied thereto.

* * * * *